US012683927B2

(12) United States Patent
Vörös et al.

(10) Patent No.: US 12,683,927 B2
(45) Date of Patent: Jul. 14, 2026

(54) WEB CONTENT FILTERING

(71) Applicant: Sophos Limited, Abingdon (GB)

(72) Inventors: Tamás Vörös, Budapest (HU);
Konstantin Berlin, Potomac, MD (US);
Sean Paul Bergeron, Budaörs (HU)

(73) Assignee: Sophos Limited, Abingdon (GB)

( * ) Notice: Subject to any disclaimer, the term of this
patent is extended or adjusted under 35
U.S.C. 154(b) by 115 days.

(21) Appl. No.: 18/616,567

(22) Filed: Mar. 26, 2024

(65) Prior Publication Data

US 2024/0372830 A1     Nov. 7, 2024

Related U.S. Application Data

(60) Provisional application No. 63/537,267, filed on Sep.
8, 2023, provisional application No. 63/464,588, filed
on May 7, 2023.

(51) Int. Cl.
*H04L 9/40*          (2022.01)
*G06F 16/955*       (2019.01)
(52) U.S. Cl.
CPC ...... *H04L 63/0236* (2013.01); *G06F 16/9566*
(2019.01)
(58) Field of Classification Search
None
See application file for complete search history.

(56) References Cited

U.S. PATENT DOCUMENTS 11,455,551 B2 * 9/2022 Hewlett, II ........... G06N 20/20

OTHER PUBLICATIONS

Eric Ye et al. "Multiple Taxonomic Web Page Classification for
Contextual Targeting at Yahoo" (Year: 2022).*
Eric Ye et al. (Year: 2022).*
Ye, Eric et al., "Multilingual Taxonomic Web Page Classification for
Contextual Targeting at Yahoo", NPL-1194 Sep. 13, 2022 , 9 pages.
UKIPO, , "UK Application No. 2406335.6 Search and Examination
Report mailed Jan. 30, 2025", NPL-1194 , 10 pages.

* cited by examiner

*Primary Examiner* — Cai Y Chen
(74) *Attorney, Agent, or Firm* — Strategic Patents, P.C.

(57)          ABSTRACT

A large language model (LLM) is trained to classify Uni-
form Resource Locator (URL) requests using a data that has
been labeled with a domain-to-category database of corre-
sponding, suitable categories for web content. This model
can then be distilled using a student model trained to
reproduce the behavior of the tuned large language model.
The resulting student model can be deployed inline as a
content filter for, e.g., content-based filtering of web requests
from endpoints behind a firewall or other network device.
While this disclosure emphasizes filtering of outbound
URL's from network endpoints, it will be understood that
the techniques described herein may also or instead be used
to create inbound content filters using similarly derived
student models that have been trained to identify content
based on metadata, text content, image content, and so forth.

20 Claims, 13 Drawing Sheets

700

GENERATING A LABELLED DATA SET
702

GENERATING A CATEGORIZATION MODEL BY FINE-TUNING A LARGE LANGUAGE MODEL WITH THE LABELLED DATA SET
704

DISTILLING THE CATEGORIZATION MODEL
706

DEPLOYING THE DISTILLED CATEGORIZATION MODEL IN AN INLINE CONTENT FILTER
708

800

RECEIVING A REQUEST AT A FIREWALL, FROM AN ENDPOINT, FOR A
NETWORK RESOURCE IDENTIFIED BY A URL
802

IDENTIFYING A CATEGORY FOR THE NETWORK RESOURCE FROM A
PLURALITY OF CATEGORIES BY APPLYING THE URL TO A URL
CATEGORIZATION MODEL
804

SELECTING A POLICY FOR PROCESSING THE REQUEST BASED ON
THE CATEGORY
806

PROCESSING THE REQUEST ACCORDING TO THE POLICY
808

810

RECEIVING A RESPONSE AT A FIREWALL
812

IDENTIFYING A CATEGORY FOR THE CONTENT OF THE RESPONSE FROM A PLURALITY OF CATEGORIES BY APPLYING THE CONTENT TO A CONTENT CATEGORIZATION MODEL
814

SELECTING A POLICY FOR PROCESSING THE RESPONSE BASED ON THE CATEGORY
816

PROCESSING THE RESPONSE ACCORDING TO THE POLICY
818

| Parameter | Value |
| --- | --- |
| model_name | bert-base-uncased |
| hidden_size | 768 |
| hidden_act | gelu |
| initializer_range | 0.02 |
| vocab_size | 30522 |
| hidden_dropout_prob | 0.1 |
| num_attention_heads | 12 |
| type_vocab_size | 2 |
| max_position_embeddings | 512 |
| num_hidden_layers | 12 |
| intermediate_size | 3072 |
| attention_probs_dropout_prob | 0.1 |
| maximum sequence length | 128 |
| learning rate | 1e-4 |
| batch size | 2048 |
| optimizer | Adam |
| maximum training epochs | 20 |

FIG. 9A

| Parameter | Value |
| --- | --- |
| model_name | t5-large |
| d_ff | 4096 |
| d_kv | 64 |
| d_model | 1024 |
| dropout_rate | 0.1 |
| initializer_facto | 1.0 |
| layer_norm_epsilon | 1e-06 |
| n_positions | 512 |
| num_heads | 16 |
| num_layers | 24 |
| relative_attention_num_buckets | 32 |
| vocab_size | 32128 |
| maximum sequence length | 128 |
| learning rate | 1e-3 |
| batch size | 60 |
| optimizer | Adafactor |
| Adafactor scale_parameter | False |
| Adafactor relative_step | False |
| Adafactor warmup_init | False |
| maximum training epochs | 15 |

FIG. 9B

| Parameter | Value |
| --- | --- |
| scale_parameter | False |
| relative_step | False |
| warmup_init | False |

FIG. 9C

| Parameter | Value |
| --- | --- |
| model_name | prajjwal1/bert-tiny |
| hidden_size | 128 |
| hidden_act | gelu |
| initializer_range | 0.02 |
| vocab_size | 30522 |
| hidden_dropout_prob | 0.1 |
| num_attention_heads | 2 |
| type_vocab_size | 2 |
| max_position_embeddings | 512 |
| num_hidden_layers | 2 |
| intermediate_size | 512 |
| attention_probs_dropout_prob | 0.1 |
| maximum sequence length | 128 |
| learning rate | 1e-4 |
| batch size | 49160 |
| optimizer | Adam |
| maximum training epochs | 20 |

*FIG. 9D*

| Parameter | Value |
| --- | --- |
| vocab_size | 76 |
| filter_size | 128 |
| dropout | 0.05 |
| learning rate | 1e-3 |
| batch size | 49160 |
| optimizer | Adam |
| maximum training epochs | 20 |

*FIG. 9E*

WEB CONTENT FILTERING

RELATED APPLICATIONS

This application claims the benefit of U.S. Prov. App. No. 63/464,588 filed on May 7, 2023 and U.S. Prov. App. No. 63/537,267 filed on Sep. 8, 2023. Each of the foregoing applications is hereby incorporated by reference in its entirety.

FIELD OF DISCLOSURE

The present disclosure relates to web content filtering. Particularly, but not exclusively, the present disclosure relates to inline filtering of web content using a categorization model; more particularly, but not exclusively, the categorization model is distilled from a fine-tuned large language model.

BACKGROUND

A content filter can be deployed inline at a firewall or other network device to filter outbound and inbound network traffic from and to an endpoint so as to restrict access at the endpoint to potentially harmful or malicious content.

There remains a need for improved techniques to filter web content.

SUMMARY

A large language model (LLM) is trained to classify Uniform Resource Locator (URL) requests using a data that has been labeled with a domain-to-category database of corresponding, suitable categories for web content. This model can then be distilled using a student model trained to reproduce the behavior of the tuned large language model. The resulting student model can be deployed inline as a content filter for, e.g., content-based filtering of web requests from endpoints behind a firewall or other network device. While this disclosure emphasizes filtering of outbound URL's from network endpoints, it will be understood that the techniques described herein may also or instead be used to create inbound content filters using similarly derived student models that have been trained to identify content based on metadata, text content, image content, and so forth.

In one aspect, a computer program product described herein includes computer executable code embodied in a non-transitory computer readable medium that, when executing on one or more computing devices, causes the one or more computing devices to perform the steps of: generating a labelled data set by labelling a data set of Uniform Resource Locator (URL) samples based on a plurality of categories of web content; generating a categorization model by fine-tuning a large language model with the labelled data set to identify one of the plurality of categories for an input URL; distilling the categorization model into a URL categorization model; and deploying the URL categorization model in an inline content filter for endpoint requests.

The computer program product may include code that causes the one or more computing devices to filter requests from an endpoint with the inline content filter. The computer program code may include code that causes the one or more computing devices to perform the steps of: receiving a request at the firewall, from an endpoint, for a network resource identified by a URL; identifying a category for the network resource from the plurality of categories by applying the URL to the URL categorization model; selecting a policy for processing the request based on the category; and processing the request according to the policy.

Labelling the data set may include labelling the data set using a domain-to-category mapping database with label propagation. Distilling the categorization model may include using the categorization model as a teacher model to train the URL categorization model as a student model that reproduces behavior of the categorization model with fewer parameters. The inline content filter may be configured to receive a URL in a request from an endpoint, determine one of the plurality of categories for the URL, and process the request based on a policy for the one of the plurality of categories for the URL. The inline content filter may be deployed in a firewall. The firewall may be an endpoint firewall or a gateway firewall. The firewall may be managed by a threat management facility for an enterprise network.

In one aspect, the inline content filter may determine a category for a URL in a request received from an endpoint, the inline content filter may apply a policy to the request based on the category, and the policy may be managed by a threat management facility for an enterprise network associated with the firewall. The firewall may be an endpoint firewall. The firewall may be a firewall in a gateway to an enterprise network.

In another aspect, a method disclosed herein includes generating a labelled data set by labelling a data set of content samples based on a plurality of categories of web content; generating a categorization model by fine-tuning a large language model with the labelled data set to identify one of the plurality of categories for an item of web content; distilling the categorization model into a content categorization model; and deploying the content categorization model in an inline content filter.

The inline content filter may be deployed in at least one of an endpoint, a gateway, and a firewall. The inline content filter may be deployed to filter content retrieved in response to a network request from an endpoint. The content samples may include one or more of images and text. The content samples may include HTML metadata for web pages.

In another aspect, a system described herein includes an endpoint; a network resource accessible by a Uniform Resource Locator; and a firewall between the endpoint and the network resource. The firewall may be configured by computer executable code to process a request from the endpoint by: determining a category for the URL with a URL categorization model, and applying a policy for an enterprise network associated with the firewall to the request based on the category, wherein the URL categorization model is configured by: generating a labelled data set by labelling a data set of Uniform Resource Locator (URL) samples based on a plurality of categories of web content, generating a categorization model by fine-tuning a large language model with the labelled data set to identify one of the plurality of categories for an input URL, and distilling the categorization model into the URL categorization model.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIGS. 9A-9E show hyperparameters for various models according to embodiments of the present disclosure.

DETAILED DESCRIPTION

Figure 1:
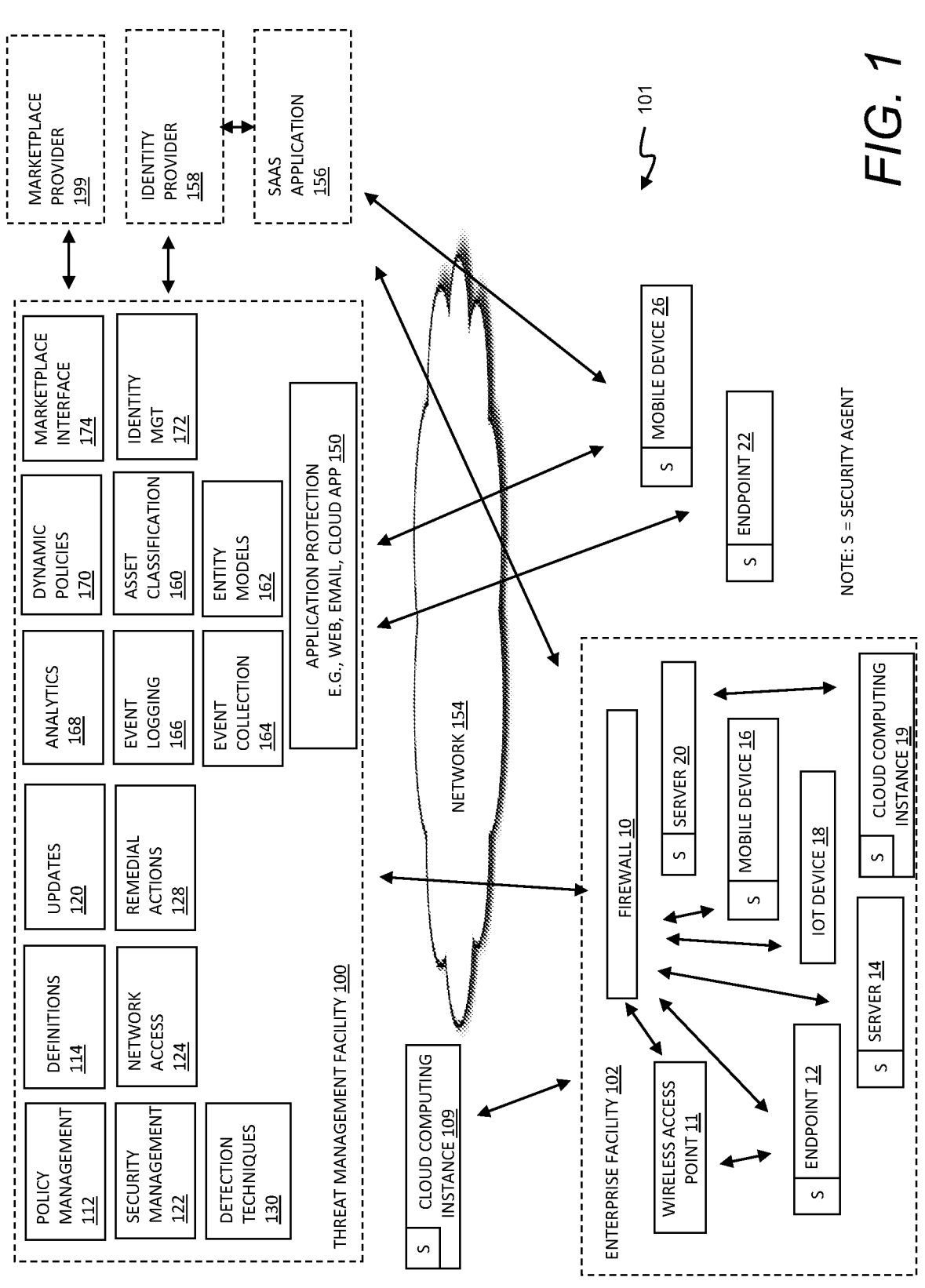
FIG. 1 depicts a block diagram of a threat management system.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances, or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated, and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, or may be part of the threat management facility 100, the cloud enterprise facility 280, the enterprise facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In an embodiment, the policy management facility 112 and the security facility 122 may work in concert with the update management facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, IOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that is accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be the identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility. Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Figure 2:
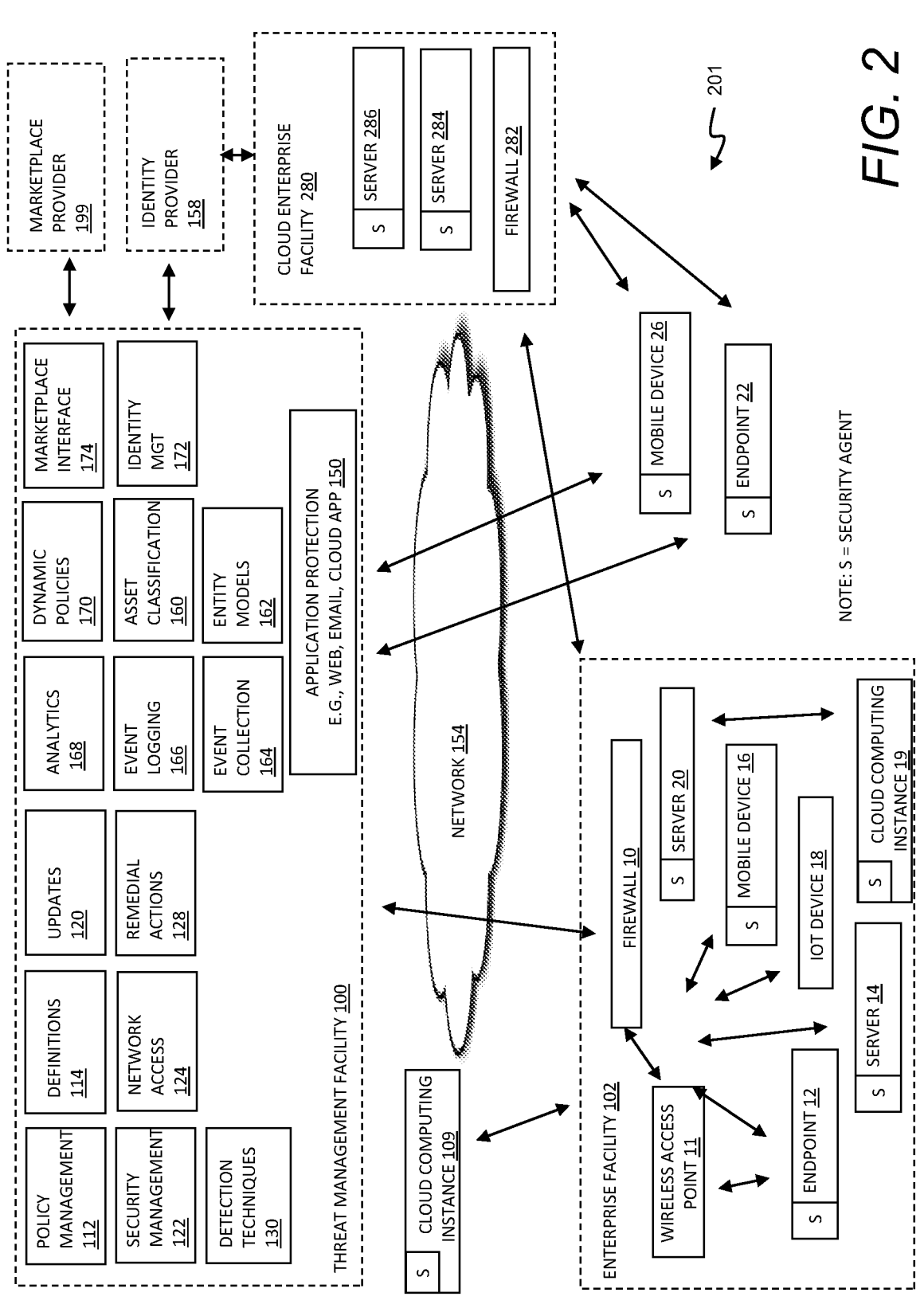
FIG. 2 depicts a block diagram of a threat management system.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
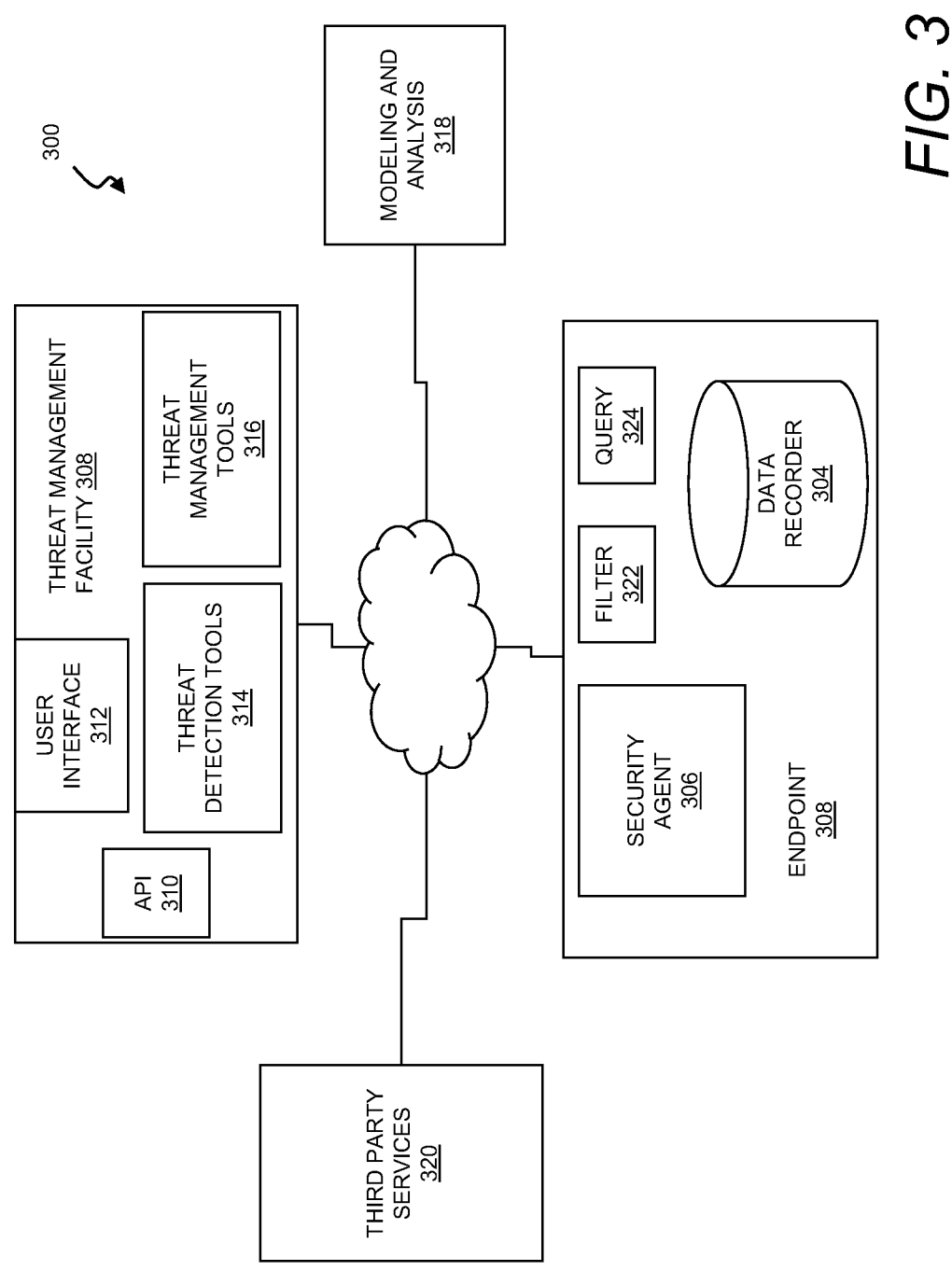
FIG. 3 shows a system for enterprise network threat detection.

FIG. 3 shows a system 300 for enterprise network threat detection. The system 300 may use any of the various tools and techniques for threat management contemplated herein. In the system, a number of endpoints such as the endpoint 302 may log events in a data recorder 304. A local agent on the endpoint 302 such as the security agent 306 may filter this data and feeds a filtered data stream to a threat management facility 308 such as a central threat management facility or any of the other threat management facilities described herein. The threat management facility 308 can locally or globally tune filtering by local agents based on the current data stream, and can query local event data recorders for additional information where necessary or helpful in threat detection or forensic analysis. The threat management facility 308 may also or instead store and deploys a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314.

In general, the application programming interface 310 may support programmatic connections with third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers, and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review and analysis of security breaches, and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g. models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network, and the like. The level of reporting may also or instead be based on currently available network and computing resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus for example, the threat management facility 308 may request all changes to the registry of system information for the past forty eight hours, all files opened by system processes in the past day, all network connections or network communications within the past hour, or any other parametrized request for activities monitored by the data recorder 304. In another aspect, the entire data log, or the entire log over some predetermined window of time, may be requested for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, detect malware on the endpoint based on the filtered event stream, and remediate the endpoint when malware is detected, the threat management facility further configured to modify security functions within the enterprise network based on a security state of the endpoint.

The threat management facility may be configured to adjust reporting of event data through the filter in response to a change in the filtered event stream received from the endpoint. The threat management facility may be configured to adjust reporting of event data through the filter when the filtered event stream indicates a compromised security state of the endpoint. The threat management facility may be configured to adjust reporting of event data from one or more other endpoints in response to a change in the filtered event stream received from the endpoint. The threat management facility may be configured to adjust reporting of event data through the filter when the filtered event stream indicates a compromised security state of the endpoint. The threat management facility may be configured to request additional data from the data recorder when the filtered event stream indicates a compromised security state of the endpoint. The threat management facility may be configured to request additional data from the data recorder when a security agent of the endpoint reports a security compromise independently from the filtered event stream. The threat management facility may be configured to adjust handling of network traffic at a gateway to the enterprise network in response to a predetermined change in the filtered event stream. The threat management facility may include a machine learning model for identifying potentially malicious activity on the endpoint based on the filtered event stream. The threat management facility may be configured to detect potentially malicious activity based on a plurality of filtered event streams from a plurality of endpoints. The threat management facility may be configured to detect malware on the endpoint based on the filtered event stream and additional context for the endpoint.

The data recorder may record one or more events from a kernel driver. The data recorder may record at least one change to a registry of system settings for the endpoint. The endpoints may include a server, a firewall for the enterprise network, a gateway for the enterprise network, or any combination of these. The endpoint may be coupled to the enterprise network through a virtual private network or a wireless network. The endpoint may be configured to periodically transmit a snapshot of aggregated, unfiltered data from the data recorder to the threat management facility for remote storage. The data recorder may be configured to delete records in the data recorder corresponding to the snapshot in order to free memory on the endpoint for additional recording.

Figure 4:
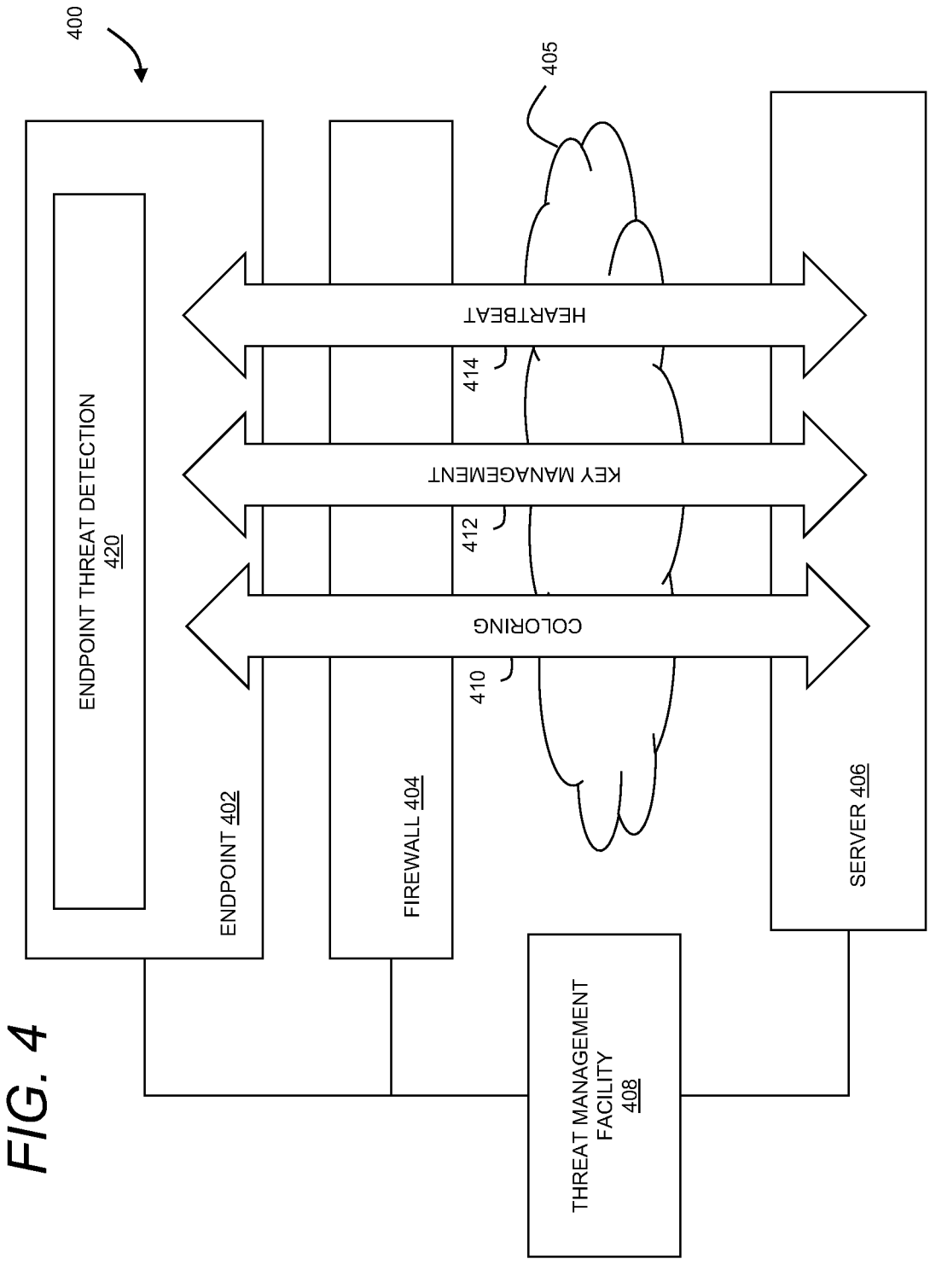
FIG. 4 illustrates a threat management system.

FIG. 4 illustrates a threat management system. In general, the system 400, which may be any of the enterprise networks and/or other networks or systems described herein, may include an endpoint 402, a firewall 404, a server 406 and a threat management facility 408 coupled to one another directly or indirectly through a data network 405, all as generally described above with reference to FIGS. 1-3. Each of the entities depicted in FIG. 4 may, for example, be implemented on one or more computing devices such as the computing devices described herein. A number of systems and subsystems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 402 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted, or otherwise modified. More generally, the cooperation of these systems enables a wide variety of reactive measures that can improve detection and remediation of potential threats to an endpoint.

Figure 5:
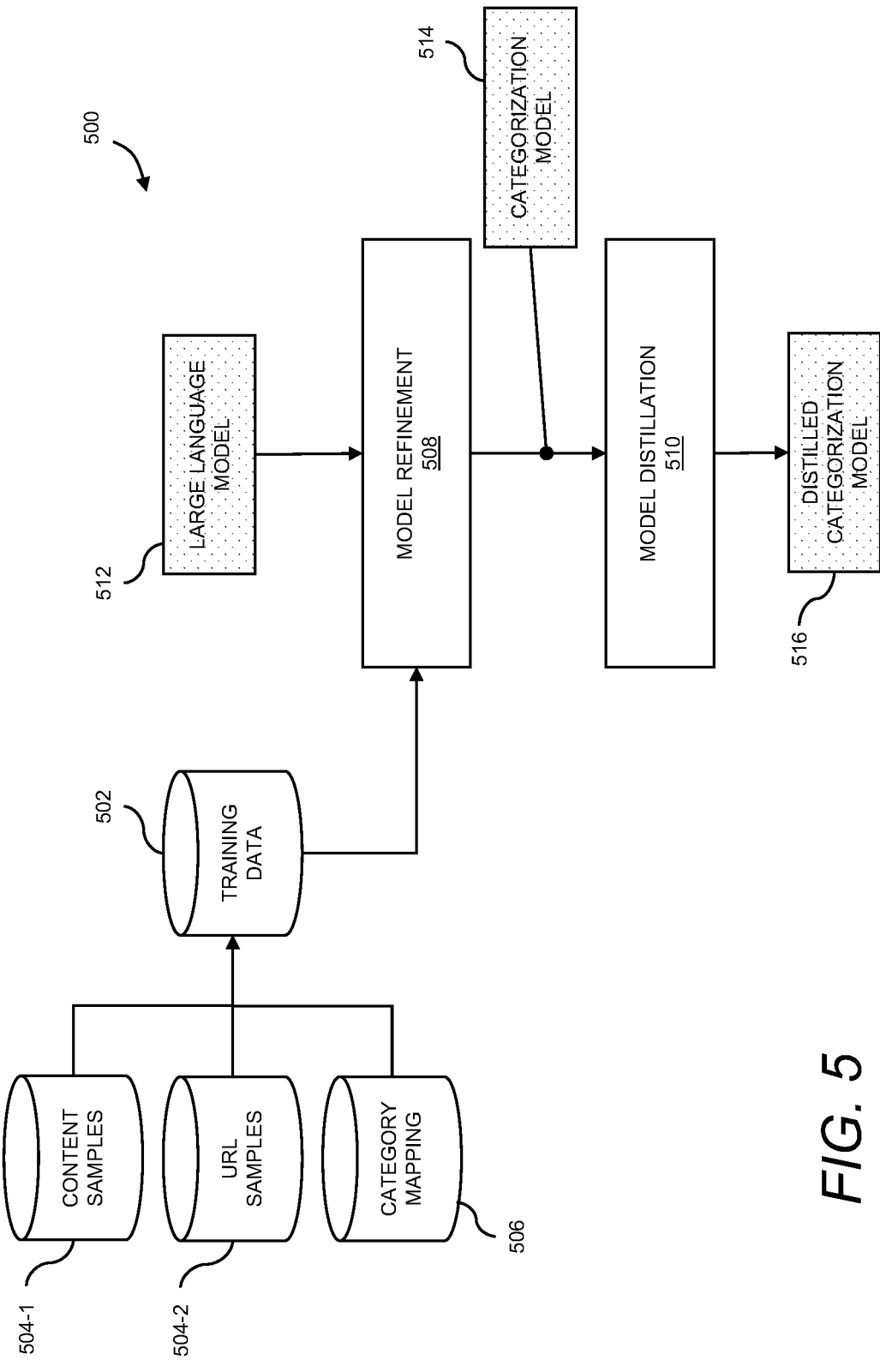
FIG. 5 illustrates a system for creating a distilled categorization model.

FIG. 5 illustrates a system 500 for creating a distilled categorization model such as a URL categorization model or a content categorization model. The distilled categorization model may be deployed within an inline content filter to process/filter outbound URL requests or inbound content (e.g., HTML metadata, images, text, and other web content) retrieved in response to an outbound request. Advantageously, the distilled categorization model is a refined and distilled model which may generate accurate category predictions for an input item (e.g., URL or web content) with reduced model complexity thus making more efficient use of computational resources when deployed. The distilled categorization model is therefore particularly suitable for inline deployment within a firewall, gateway, or the like.

FIG. 5 shows a labelled data set 502 of training data, a data set of content samples 504-1, a data set of URL samples 504-2, and a category mapping 506 comprising a plurality of categories of web content. FIG. 5 further shows a model refinement process 508 and model distillation process 510. A large language model 512 may be fine-tuned (refined) to a categorization model 514 using the model refinement process 508. The categorization model 514 may be distilled to a distilled categorization model 516 using the model distillation process 510. The distilled categorization model 516 may be, e.g., a content categorization model (if created from a categorization model refined using the data set of content samples 504-1) or a URL categorization model (if created from a categorization model refined using the data set of URL sample 504-2).

In general, the labelled data set 502 may be generated by labelling the data set of content samples 504-1 or the data set of URL samples 504-2 based on the plurality of categories of web content in the category mapping 506. This may include manual labelling, automated labelling, or some combination of these. The labelled data set 502 may be used by the model refinement process 508 to generate the categorization model 514 by fine-tuning the large language model 512 with the labelled data set 502 to identify one of the plurality of categories for an input content item (e.g., HTML metadata for web pages, text, images, etc.) or input URL. As a result, the large language model 512 may be trained/refined to provide a discrete category for an input content item or input URL. For example, the categorization model 514 may assign the category "Sports" to the input URL "detroitlions.com". The model distillation process 510 then distills the categorization model 514 into the distilled categorization model 516 (e.g., a content categorization model or URL categorization model). This may, for example, include providing a student model (e.g., the distilled categorization model 516) which can be trained to mimic the behavior of a larger model (e.g., the categorization model 514) with a reduced number of parameters. As such, the distilled categorization model 516 may be trained, using the categorization model 514 as a teacher, to select a category for a content item or URL. Because the distilled categorization model 516 comprises a reduced complexity representation of the categorization model 514, it may be efficiently deployed as part of an inline content filter to process requests (e.g., outbound requests from an endpoint to access a network resource or inbound content received in response to an outbound request) in real-time or near real-time with a similar degree of accuracy to the categorization model 514 but at a lower computational cost.

The labelled data set 502 corresponds to a training data set for the fine-tuning performed by the model refinement process 508. The labelled data set 502 may, for example, be generated from the date set of content samples 504-1 or the data set of URL samples 504-2 using any suitable domain-to-category mapping or other labelling tool(s). In general, domain-to-category mappings are lists of domains grouped by categories (e.g., manually assigned categories). Using such mappings, content (such as HTML metadata for web pages, text, etc.) or URL's may be mapped using a set of categories such as "Chat", "Games", "Shopping", "Sports", "News", "Job Search", "Search Engines", "Alcohol", "Gambling", "Weapons", "Porn", "Banking", "Business", "Education", "Entertainment", "Food and Dining", "Government", "Health and Medicine", "Motor Vehicles", "Peer to Peer", "Real Estate", "Religion", "Travel", "Translators", "Computer and Internet", "Hunting and Fishing", "Marijuana", "Radio and Audio Hosting", "Social Networking", and "Video Hosting". The majority of websites may belong to categories such as "Computer and Internet", "Search Engines", and "Business", while niche categories such as "Hunting and Fishing" and "Marijuana," might be less prevalent, but nonetheless usefully be monitored by an enterprise for purposes of managing network security, employee productivity, legal liability, or other interests or concerns. Signature-based extensions to domain-to-category mappings, such as label-propagating signatures, may extend and enhance domain-to-category mappings by assigning content or URLs to categories based on signatures or rules, which may be created by analysts to assist in manual or semi-automated labeling of large data sets. One example of signature-based domain-to-category mapping is label propagation (or category propagation) which propagates categories based on domains and subdomains, or other rules. An example of this kind of label propagation is to maintain a list of known domains with predetermined categories, such as labeling "online-shop.com" as an e-commerce site and "news-site.com" as a news site. All URLs under these domains may inherit the category of the parent. For instance, any URL under "online-shop.com" (e.g., "online-shop.com/products/clothing", "online-shop.com/products/electronics", etc.) can be assigned the category e-commerce while any URL under "news-site.com" (e.g., "news-site.com/politics", "news-site.com/technology", etc.) is assigned the category news. As such, in one embodiment the labelled data set 502 is generated from the data set of content samples 504-1 or the data set of URL samples 504-2 using label propagation and a domain-to-category mapping database (e.g., as contained within the category mapping 506).

While the types of labels described above support category mapping, it will be understood that other signature-based methods may also or instead be used provided they usefully map content samples or URL sequences to particular content types. For example, longest prefix matching or additional signatures can facilitate category-based differentiation among ambiguous websites that share top-level domain information but vary substantially in content types, such as "reddit.com/r/sports" versus "reddit.com/r/news".

In one embodiment, the labelled data set 502 is generated from less popular or frequently visited URLs/domains. Websites such as "stackoverflow.com" are well-known and requests associated with such websites may be automatically allowed by a content filter to help reduce latency on more common websites. In consequence, the distilled categorization model 516 may be trained using a labelled data set of less popular or less frequently visited URLs so as to align the distilled categorization model 516 with actual deployment scenarios and help reduce the likelihood of false positives. In such embodiments, less popular or less frequently visited URLs may be identified by ranking the data set of URL samples 504-2 by frequency of visit and labelling those URL samples 504 which fall within the long tail of the resulting frequency distribution (e.g., the final 1%, 5%, 10%, 15%, etc. of URLs).

While the long tail of URL samples can be usefully labeled to improve the accuracy of content filtering as described herein, it may be undesirable to use signature-based labeling that was developed for more prevalent domains, e.g., where the corresponding learned or applied labeling patterns for popular domains may be insufficient for accurate content classification in the long tail of the URL distribution. In this case, superior generalization capabilities for out-of-distribution samples may usefully be achieved by inferring a description from the URL itself, e.g., by training a large language model on labeled long tail data, by using the large language model to provide a description of the URL for use in a subsequent automated labeling task, and/or by using a large language model to provide a label based on the categories outlined above. As a significant advantage, an advanced large language model (such as Generative Pre-trained Transformer 3 (GPT-3) (or GPT-3.5, GPT-4, and so forth), Bidirectional Encoder Representations from Transformers (BERT), and Text-to-Text Transfer Transformer (T5)) may be used, e.g., to generate a description or categorization of a long tail URL based on a very large natural language training set, and this categorization information may be used to create, refine, and/or distill a categorization engine that benefits from the capabilities of the large language model without requiring the large language model to be deployed at the point of web content filtering.

In one embodiment, the URLs in the data set of URL samples 504-2 are split at the first occurrence of the "?" character and the query parameters removed. This helps reduce the noise within the data since the query is assumed to be noisy and without meaningful information. The URLs may also be truncated to tokens of a fixed length (e.g., 64 characters, 128 characters, etc.).

The model refinement process 508 generates the categorization model 514 from the labelled data set 502 by fine-tuning the large language model 512 with the labelled data set 502 to identify one of the plurality of categories for an input item of web content or URL. As a result, the large language model may be trained/refined to provide a discrete category for an input item of web content or input URL. Suitable large language models, such as GPT-4, BERT, T5, and the like may be adapted to this purpose. More generally, numerous large language model architectures are known in the art and may be adapted for use as a large language model for the training purposes described herein.

In one embodiment, the large language model 512 is a BERT model. BERT is an encoder model that generates contextualized word embeddings by processing the input text through a stack of transformer encoder layers. BERT uses bidirectional processing to capture the context and meaning of each word in the input text. This means that BERT processes the entire input text in both forward and backward directions, allowing it to capture contextual information from the entire sentence. BERT is pre-trained on large amounts of text data using a masked language modeling task and a next sentence prediction task. During pre-training, BERT learns to predict masked words in a sentence and to determine whether two sentences are consecutive or not. By pre-training on large amounts of text data, BERT can generate high-quality contextualized embeddings that can be fine-tuned for a wide range of natural language processing tasks such as content categorization based on HTML web page content, a URL text string, or other textual representations. In one implementation, the large language model 512 is a pre-trained BERT model (such as the default pre-trained BERT model provided by HuggingFace) with the hyperparameter configuration shown in FIG. 9A. The model refinement process 508 fine-tunes (trains/refines) the large language model 512 by retraining the large language model 512 using the labelled data set 502 and an Adam optimizer with weight decay. In further embodiments the BERT model may be one trained on a non-English language corpus, such as BETO (Spanish) or CamemBERT (French) or any other suitable model.

In a further embodiment, the large language model 512 is a GPT model. GPT is a decoder model that uses a decoder-only architecture for language modeling tasks, such as text generation, summarization, and question answering. In GPT, the decoder processes the input text one token at a time, conditioned on the preceding tokens in the sequence. GPT uses a variant of the Transformer architecture called the "Transformer decoder" to generate output text autoregressively. The Transformer decoder is made up of a stack of layers that perform multi-head attention and feed-forward operations on the input text. GPT is trained on large amounts of text data using an unsupervised learning approach to learn to predict the next word in a sequence given the preceding words, with a goal of maximizing the likelihood of predicting the correct next word. By pre-training on large amounts of text data, GPT can generate high-quality text that is grammatically correct and semantically coherent. Moreover, multimodal GPT models such as GPT-4 may be used to generate textual responses from image and/or text inputs. GPT based large language models can then be refined, e.g., based on the labeled data described above, to predict a content category corresponding to an item of web content or URL input text. In one implementation, the large language model 512 is a pre-trained GPT-3 model (such as the Babbage model provided by OpenAI) with temperature set to 0, logit bias for tokens associated with the class labels set to 100, and the stop token set to the stop sequence seen during training. The GPT-3 model is fine-tuned by the model refinement process 508 by employing a suitable re-training approach with the labelled data set 502 (e.g., by using the fine-tuning API provided by OpenAI).

In another embodiment, the large language model 512 is a T5 model. T5 uses an encoder-decoder architecture, where the input text is first encoded into a fixed-length representation by a stack of Transformer encoder layers. The context vector generated by the encoder is then fed into a stack of Transformer decoder layers, which generate the output text one token at a time, conditioned on the input text. This "text-to-text" framework treats all natural language processing tasks as text-to-text transformations, meaning that T5 can be trained to perform any natural language processing task by mapping an input text to an output text, regardless of the specific task. As with other large language models an encoder-decoder model such as T5 can generate high-quality contextualized embeddings that can be fine-tuned for a natural language processing task such as identifying a content category based on an input item of web content or an input URL string. In one implementation, the large language model 512 is a pre-trained T5 large model (such as that provided by HuggingFace) with the hyperparameter configuration shown in FIG. 9B and is fine-tuned (trained/refined) by the model refinement process 508 using the Adafactor optimizer with the hyperparameter configuration shown in FIG. 9C.

The model distillation process 510 distills the categorization model 514 into the distilled categorization model 516. Model distillation—alternatively referred to as distillation or knowledge distillation—is the process of transferring the knowledge from a large model to a smaller model while maintaining the predictive performance and properties of the large model. In the present case, the predictions of the categorization model 514 are distilled into the distilled categorization model 516. This may, for example, include providing a student model based on DistilBERT, Mobile-BERT, or TinyBERT, any of which provide a model distillation framework that can be trained to mimic the behavior of a larger model with a reduced number of parameters. The student model (i.e., the distilled categorization model 516) may then be trained, using the categorization model 514 as a teacher, to select a category for an item of web content or a URL. As a significant advantage, this can reduce the computational complexity of the executing model, and facilitate use in time-sensitive security tasks such as inline content categorization, where observable latency may significantly impair system performance and user experience, particularly for high-traffic applications. It will be understood that a useful student model is not limited to transformer architectures mentioned above, and may also or instead use other student model types such as a convolutional model. For example, student models may include distilled models trained to mimic the behavior of a larger parent model, pruned models that are obtaining removing a subset of weights or neurons from a larger model, quantized models that reduce the number of bits used to represent model weights or activations, as well as hybrid models that combine two or more of these approaches. Also, while the distilled models may begin with a smaller version of the transformer architecture used by a large language model, other distillation techniques are known in the art, such as convolutional models that use convolutional neural networks to compress larger pretrained models. More generally, any technique or combination of techniques suitable for compressing a refined large language model into a model of sufficiently reduced size and complexity for deployment as an inline content filter or the like may be used to create a student model as contemplated herein.

In one embodiment, the distilled categorization model 516 is a pre-trained BERTiny model with the hyperparameter configuration shown in FIG. 9D. In an alternative embodiment, the distilled categorization model 516 is a 1-dimensional convolutional neural network such as the eXpose model described in Joshua Saxe and Konstantin Berlin, "eXpose: A character-level convolutional neural network with embeddings for detecting malicious URLs, file paths and registry keys", arXiv preprint arXiv:1702.08568 (2017), which is hereby incorporated by reference in its entirety, with the hyperparameter configuration shown in FIG. 9E. In such an embodiment, the distilled categorization model 516 is more compact and requires fewer computational resources as it is significantly smaller than the categorization model 514 from which it is trained (e.g., when trained from the T5 large model the parameters are reduced from 770 million to 4 million thereby leading to a 175 fold reduction in model size).

The model distillation process 510 may train the distilled categorization model 516 under the supervision of the categorization model 514 using any suitable student-teacher distillation process. For example, the distilled categorization model 516 may be trained by minimizing the difference between the logits produced by the categorization model 514 and those produced by the distilled categorization model 516. In a further example, rather than train directly on the logits, the target is "soft" by incorporating a temperature parameter, p, such that as p increases the softmax function on the logits of the categorization model 514 become softer thereby increasing the information provided from the teacher model (the categorization model 514) to the student model (the distilled categorization model 516).

The distilled categorization model 516, after being trained, may be deployed in an inline content filter or other process for identifying categories associated with outbound endpoint requests. This may, for example, include deploying the distilled categorization model 516 in any of the firewalls, endpoints, or other network devices or the like described herein. It will be appreciated that a similarly distilled categorization model may also or instead be created to determine a category for inbound web content, e.g., web content that has been retrieved in response to an outbound request. In general, the distilled categorization model 516 may be deployed along with a policy engine or the like that manages the policies applicable to web content for an enterprise or other managed network, and may be used to apply policy-based decision-making once a category has been identified by the distilled categorization model 516. Thus, for example, an outbound URL may be identified by a URL categorization model as relating to "Gambling," and an enterprise policy related to the use of gambling websites by employees may be applied to block the outbound request. As a further example, inbound HTML content may be identified by a content categorization model as relating to "Education" and an enterprise policy related to accessing educational websites may be applied to allow the inbound HTML content. In one aspect, multiple distilled categorization models may be used together for improved, policy-based management of network usage. For example, an outbound URL may be examined according to a first model for URL-based content filtering, and a responsive, inbound content item may be examined according to a second model for inbound content filtering.

More generally, It will be appreciated that the techniques described herein, e.g., for refining a large language model with labeled data, and then distilling the model into a more compact model for real time and/or inline security detection, may also be adapted to other security domains. For example, in one aspect, the techniques described herein may be applied to malicious command line detection. Malicious command line detection may, for example, include a process of identifying or detecting suspicious or malicious commands executed through a command line interface (CLI) of an operating system, such as the Windows PowerShell. The command line interface allows users to interact with the operating system by typing commands into a terminal or console, and provides a common vector for malicious attacks. A training data set of command lines may be labelled, and a large language model may be trained with the labelled data set of text-based command line entries to categorize command lines as malicious v. safe, or more generally to identify various types of known command line attacks. The labeling may include automated labeling based on signatures or lookups of known malicious command line strings, or based on a behavioral analysis of command line responses or the like. The labeling may also or instead include manual labelling, or manual curation of automatically labeled data sets. The resulting, refined large language model may then be used as a teacher to train a distilled model for inline deployment, e.g., on a managed endpoint.

The techniques described herein may be similarly adapted for other security uses, such as identifying sensitive or confidential data to protect against data leakage, or identifying queries or credential patterns indicative of malicious lateral movement. More generally, security task based on the identification of malicious activity in text or other data streams may be augmented using the techniques described herein.

Figure 6A:
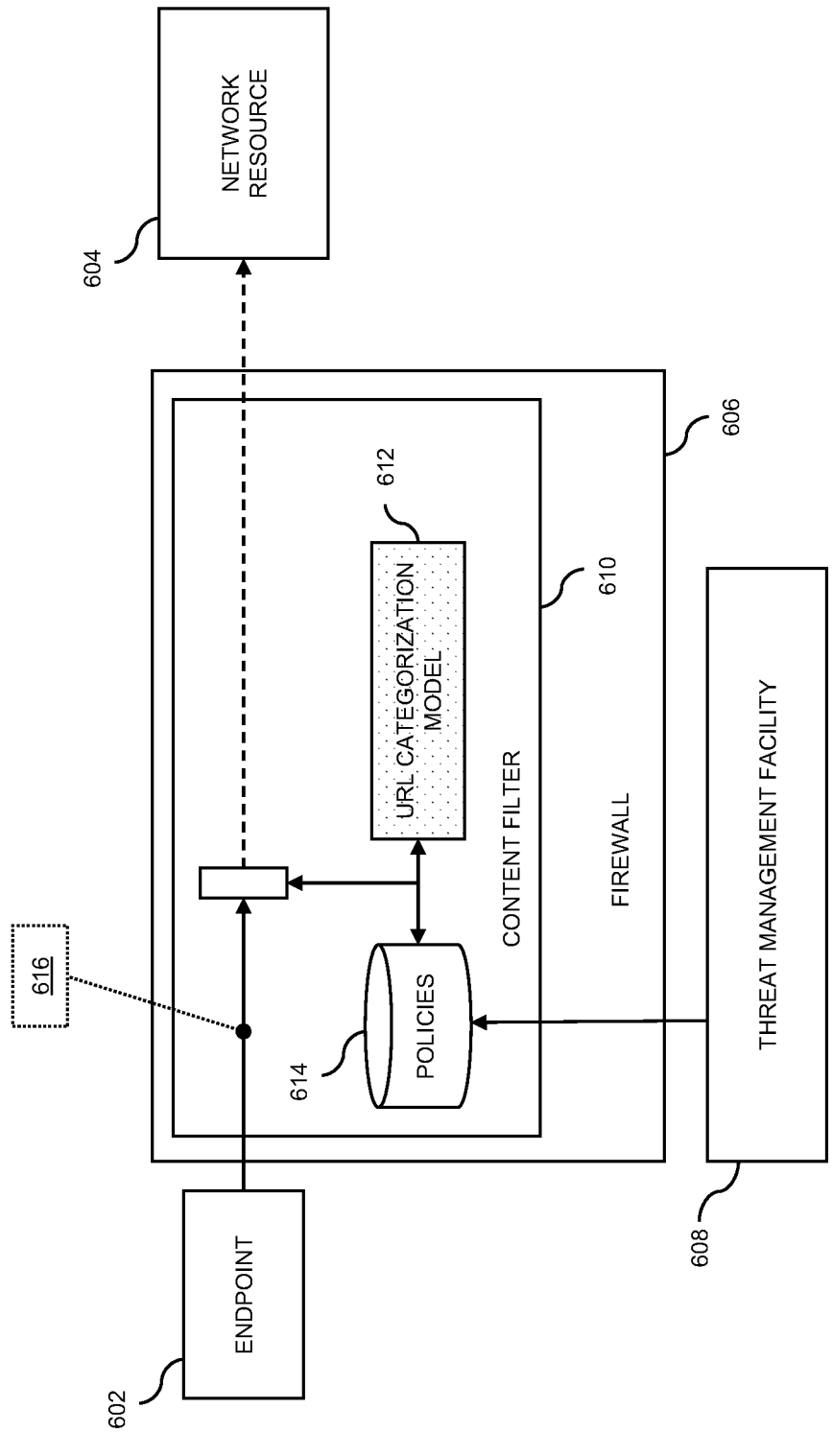
FIG. 6A illustrates a system for inline content filtering of outbound requests.

FIG. 6A illustrates a system for inline content filtering of outbound requests.

The system shown in FIG. 6A comprises an endpoint 602, a network resource 604 accessible by a Uniform Resource Locator (URL), and a firewall 606 between the endpoint 602 and the network resource 604. A threat management facility 608 may be communicatively coupled to the firewall 606. The firewall 606 may include a content filter 610 with a URL categorization model 612 and one or more enterprise policies 614. FIG. 6A further shows a request 616 to access the network resource 604. In one embodiment, the endpoint 602, the firewall 606, and the threat management facility 608 correspond to the endpoint 12, the firewall 10, and the threat management facility 100 shown in FIGS. 1 and 2.

In general, the request 616 to access the network resource 604 may be received from the endpoint 602 at the content filter 610. The content filter 610 may determine a category for the URL of the network resource 604 (included in the request) with the URL categorization model 612. The content filter 610 may then apply a policy from the one or more enterprise policies 614 for an enterprise network associated with the firewall 606 to the request 616 based on the category. As described below, application of the policy may result in the request 616 being blocked or allowed thereby denying or granting the endpoint 602 access to the network resource 604. Advantageously, the URL categorization model 612—determined using the distillation process described above in relation to FIG. 5—may be a compact, computationally efficient, model for URL filtering that is orders of magnitude smaller than the large language model from which it was trained (i.e., the categorization model 514 shown in FIG. 5). This makes the URL categorization model 612 well suited for use as a web content filter (URL filter) within a firewall, such as the firewall 606, as the URL categorization model 612 requires fewer computational resources (e.g., processing and memory requirements) and may produce lower latency results than a large language model.

The content filter 610 may be an inline content filter deployed inline between the endpoint 602 and network content (such as the network resource 604) and may be used to categorize URLs in outbound requests from the endpoint 602 so that a suitable enterprise policy can be applied to the corresponding category of web content. In one embodiment, the content filter 610 is deployed as computer executable code within the firewall 606 such that the firewall 606 is configured by the computer executable code to perform the functionality of the content filter 610 as described herein. While the content filter 610 is illustrated in FIG. 6A as being deployed in the firewall 606, it will be understood that numerous other filters may be constructed using the techniques described herein, and these filters may be deployed in numerous other locations or contexts throughout an enterprise network to support security monitoring and remediation. For example, this includes endpoint filters specific to operating systems, hardware platforms, device types, and the like. Useful filters may also or instead be created and deployed for electronic mail filtering, either on endpoints or at an email server or other service host or the like. These techniques may also or instead be used, e.g., to create a traffic filter for a wireless access point, to create a web browser extension for content filtering, malware filtering, and the like, or to manage credentials, tokens, and other traffic at an identity management platform, single sign-in platform, or the like.

The URL categorization model 612 may be distilled from a large language model (LLM) as described above in relation to FIG. 5. That is, the URL categorization model 612 may be configured by generating a labelled data set by labelling a data set of Uniform Resource Locator (URL) samples based on a plurality of categories of web content, generating a categorization model by fine-tuning a large language model with the labelled data set to identify one of the plurality of categories for an input URL, and distilling the categorization model into the URL categorization model. As such, a URL categorization model is generated which retains some or all of the predictive performance in categorization with reduced complexity and reduced computational requirements, thereby making it more suitable for deployment within an inline content filter.

The one or more enterprise policies 614 may control access to and use of the network resource 604. The threat management facility 608 may update and enforce those policies (e.g., by periodically updating the one or more enterprise policies 614 at the content filter 610). As a few non-limiting examples, policies may include a list of enterprise facility external network locations/applications that may or may not be accessed by compute instances (e.g., by the endpoint 602), a list of types/classifications of network locations or applications that may or may not be accessed by compute instances (e.g., by the endpoint 602), a list of types/classifications of web content and contextual rules to evaluate whether the lists apply. For example, there may be a rule that does not permit access to sporting websites, such that, when a website is requested by the endpoint 602 and the content filter 610 determines that the website belongs to the "Sports" category, the policy is applied to deny access to the website.

Figure 6B:
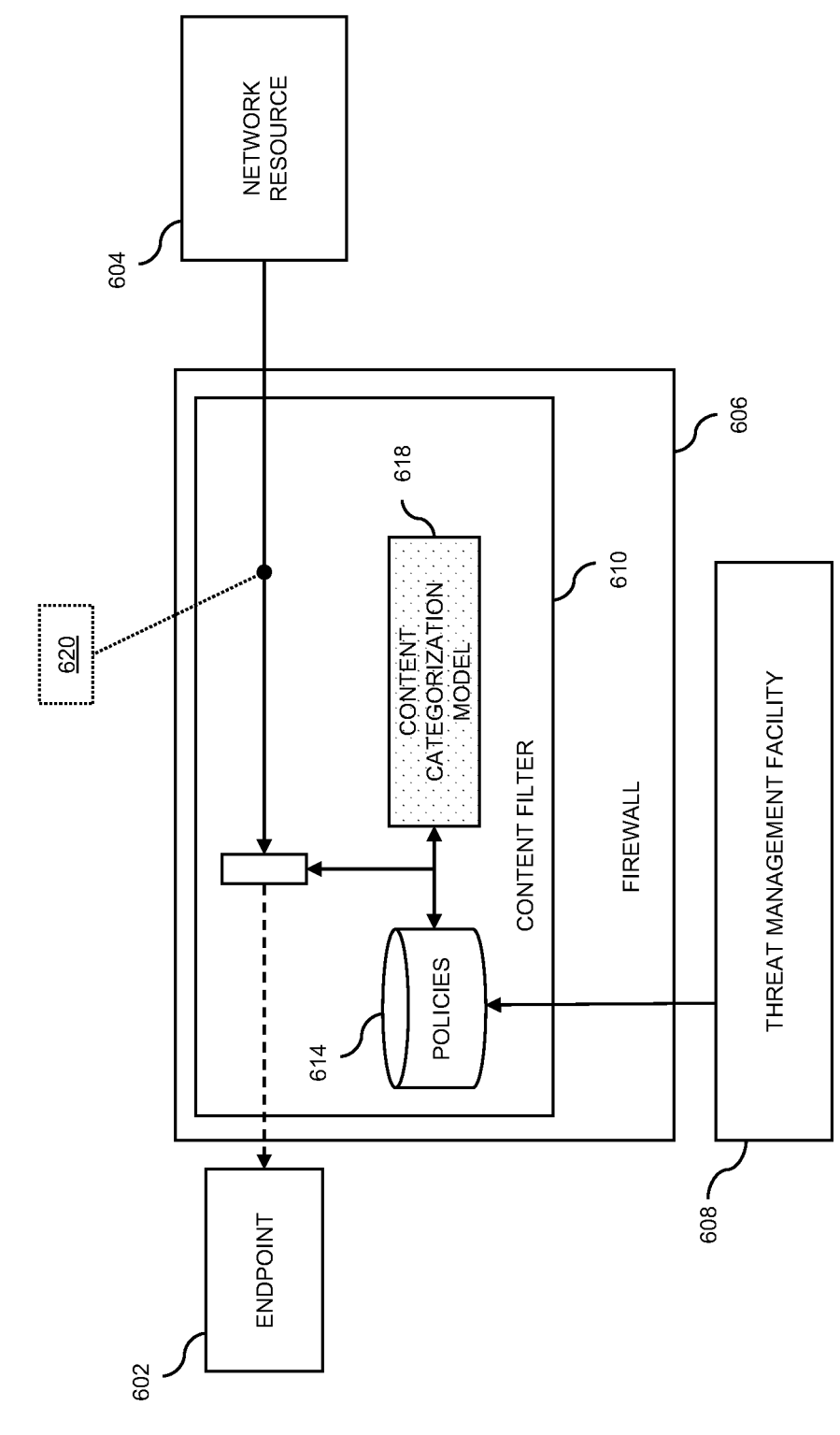
FIG. 6B illustrates a system for inline content filtering of inbound requests.

FIG. 6B illustrates a system for inline content filtering of inbound responses.

The system shown in FIG. 6B corresponds to that shown in FIG. 6A but with the addition of a content categorization model 618 and a response 620. The skilled person will appreciate that the content categorization model 618 may be deployed in conjunction with, or instead of, the URL categorization model 612 shown in FIG. 6A such that the content filter 610 may be configured to filter both outbound requests and inbound responses.

In general, the response 620 is an inbound response comprising content (e.g., web content such as HTML web page data/metadata, text, images, etc.) received at the content filter 610 in response to an outbound request (e.g., the request 616 shown in FIG. 6A). The content filter 610 may determine a category for the content of the response 620 with the content categorization model 618. The content filter 610 may then apply a policy from the one or more enterprise policies 614 for an enterprise network associated with the firewall 606 to the response 620 based on the category. As described below, an application of the policy may result in the response 620 being blocked or allowed thereby denying or granting the endpoint 602 access to the content within the response 620. Advantageously, the content categorization model 618—determined using the distillation process described above in relation to FIG. 5—can provide a compact, computationally efficient, model for web content filtering that is orders of magnitude smaller than the large language model from which it was trained (i.e., the categorization model 514 shown in FIG. 5). This makes the content categorization model 618 well suited for use as a web content filter within a firewall, such as the firewall 606, as the content categorization model 618 requires fewer computational resources (e.g., processing and memory requirements) and may produce lower latency results than compared to a large language model.

The content categorization model 618 may be distilled from a large language model (LLM) as described above in relation to FIG. 5. That is, the content categorization model 618 may be configured by generating a labelled data set by labelling a data set of web content samples based on a plurality of categories of web content, generating a categorization model by fine-tuning a large language model with the labelled data set to identify one of the plurality of categories for an input item of web content, and distilling the categorization model into the content categorization model. As such, a content categorization model can be generated that retains the predictive performance for categorization with reduced complexity and reduced computational requirements, thereby making it more suitable for deployment within an inline content filter for inbound web content.

Figure 7:
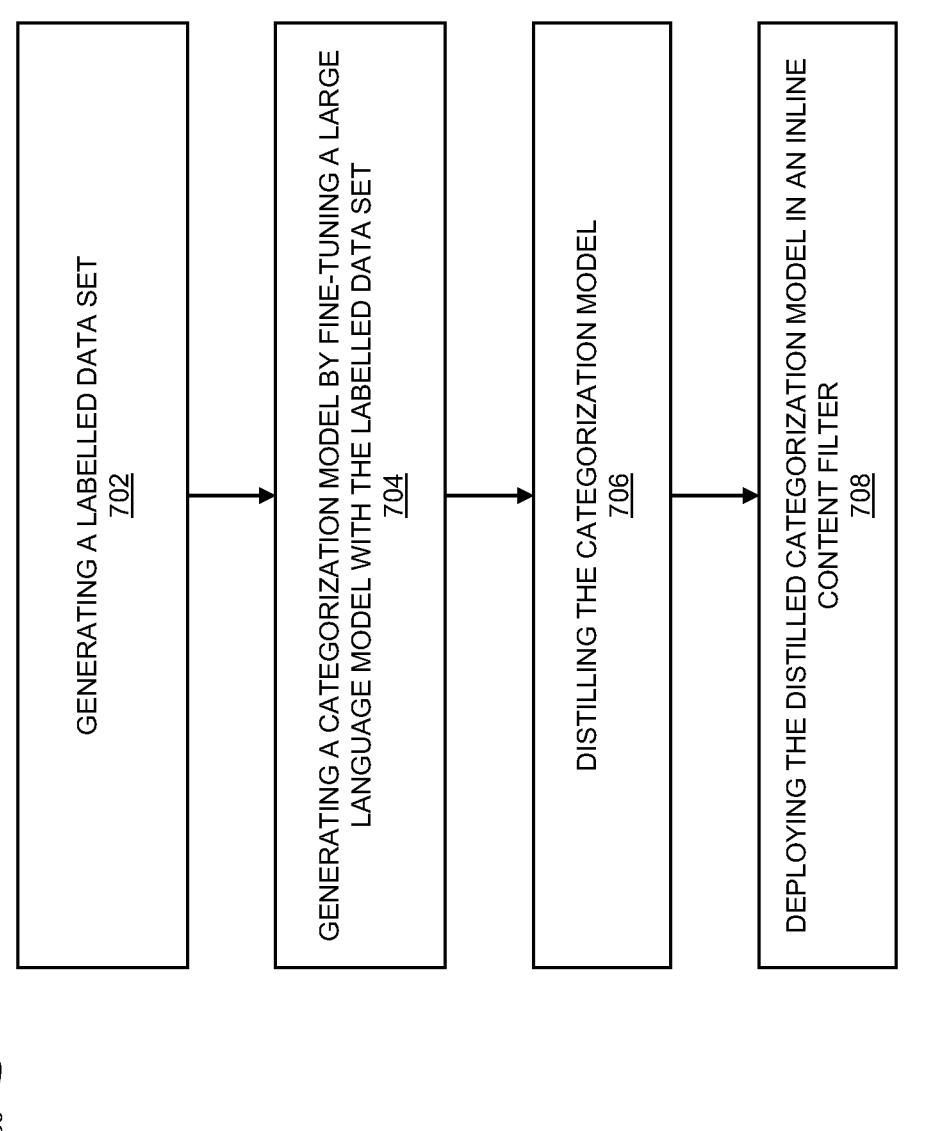
FIG. 7 depicts a flow diagram embodiment of a method for generating a distilled categorization model.

FIG. 7 depicts a flow diagram embodiment of a method 700 for generating a distilled categorization model from a fine-tuned large language model (LLM). To describe the flow diagram, reference will be made to FIGS. 5, 6A, and 6B, although it is understood that the flow diagram may be implemented in any other suitable environment or system.

At step 702 a labelled data set (e.g., the labelled data set 502 shown in FIG. 5) is generated. The labelled data set may be generated by labelling a data set of content samples based on a plurality of categories of web content (e.g., the data set of content samples 504-1 shown in FIG. 5). The set of content samples may include one or more of images and text, and/or HTML metadata for web pages. Additionally, or alternatively, the labelled data set may be generated by labelling a data set of Uniform Resource Locator (URL) samples (e.g., the data set of URL samples 504-2 shown in FIG. 5) based on a plurality of categories of web content (e.g., the plurality of categories in the category mapping 506 shown in FIG. 5). Labelling the data set may include labelling the data set using a domain-to-category mapping database with label propagation.

At step 704 a categorization model is generated by fine-tuning a large language model (LLM). The LLM may be fine-tuned with the labelled data set to identify one of the plurality of categories for an item of web content or one of the plurality of categories for an input URL. As described above in relation to the model refinement process 508 of FIG. 5, suitable LLMs include Generative Pre-trained Transformer 3 (GPT-3) (or GPT-3.5, GPT 4, and so forth), Bidirectional Encoder Representations from Transformers (BERT), Text-to-Text Transfer Transformer (T5), and the like.

At step 706 the categorization model is distilled into a distilled categorization model—e.g., a content categorization model or a URL categorization model. As described above in relation to the model distillation process 510 of FIG. 5, the distilled categorization model may be generated from the categorization model using any suitable knowledge distillation process. For example, distilling the categorization model may include using the categorization model as a teacher model to train distilled categorization model (e.g., the content categorization model or the URL categorization model) as a student model that reproduces behavior of the categorization model with fewer parameters. Advantageously, distilling the categorization model helps generate a reduced complexity categorization model which retains predictive performance while utilizing fewer system resources. This may be particularly beneficial when utilizing the distilled categorization model within an inline content filter where computational resources are limited.

At step 708 the distilled categorization model (e.g., the content categorization model or the URL categorization model) is deployed in an inline content filter. The inline content filter may be used for endpoint requests. For example, and with reference to FIG. 6A, a distilled categorization model—the URL categorization model 612—may be deployed in the content filter 610 of the firewall 606 such that the URL categorization model 612 determines a category for a request, e.g., a network request, received from the endpoint 602 (e.g., the request 616) and the content filter 610 applies a policy to the request based on the determined category. As a further example, and with reference to FIG. 6B, a distilled categorization model—the content categorization model 618—is deployed in the content filter 610 of the firewall 606 such that the content categorization model 618 determines a category for content within a response received from a network resource (e.g., the web content within the response 620). As such, the inline content filter may be deployed in a firewall which may be at least one of an endpoint firewall and a gateway firewall (e.g., the firewall is a firewall in a gateway to an enterprise network). The firewall may be managed by a threat management facility for an enterprise network (e.g., the firewall 606 in FIG. 6A is managed by the threat management facility 608).

Figure 8A:
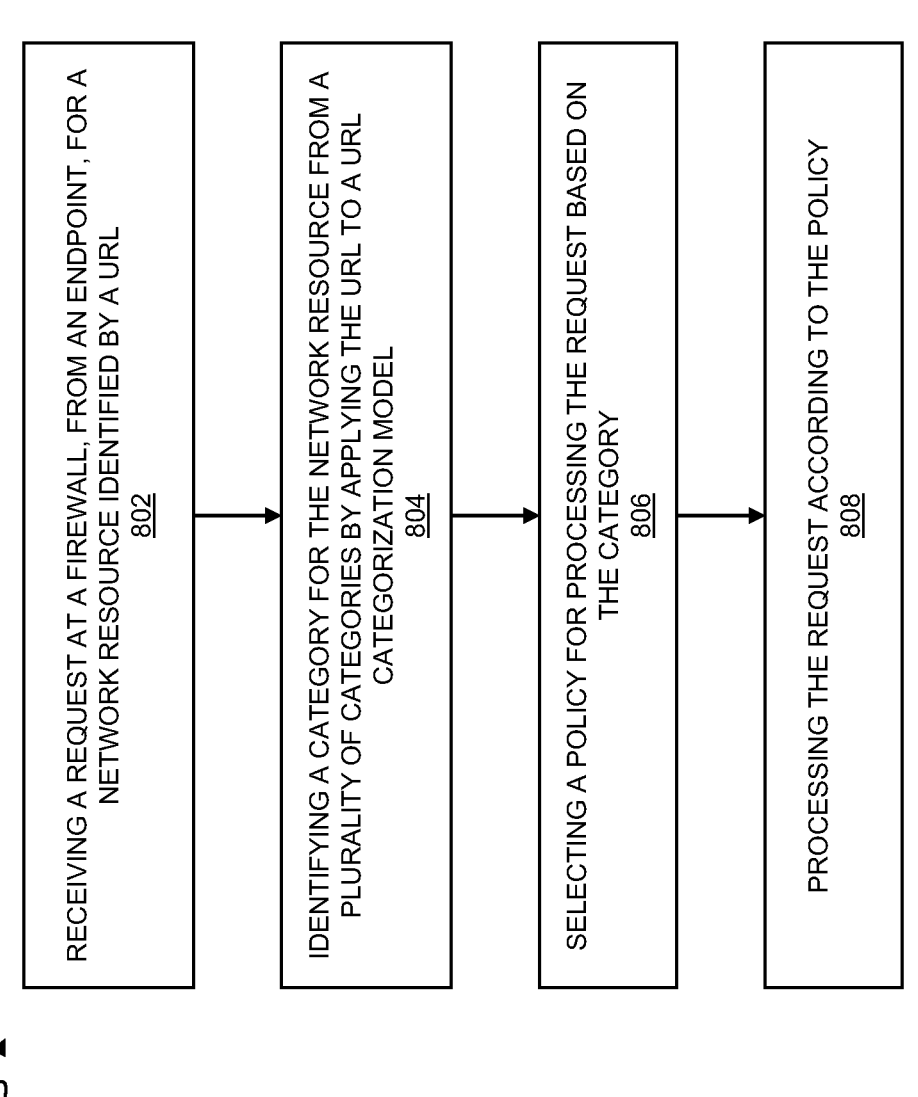
FIG. 8A depicts a flow diagram embodiment of a method for filtering requests using a URL categorization model.

FIG. 8A depicts a flow diagram embodiment of a method 800 for filtering requests using a URL categorization model. To describe the flow diagram, reference will be made to FIGS. 5 and 6A, although it is understood that the flow diagram may be implemented in any other suitable environment or system. In one embodiment, the method 800 is performed with, or as part of, the method 700 shown in FIG. 7. For example, the steps of the method 800 may be performed as part of filtering requests with the inline content filter.

At step 802, a request is received at a firewall. The request may be received from an endpoint and the request may be a request for a network resource identified by a URL. For example, as shown in FIG. 6A, the request 616 for the network resource 604 is received from the endpoint 602 at the firewall 606. The firewall may be at least one of an endpoint firewall and a gateway firewall. The firewall may be managed by a threat management facility for an enterprise network (e.g., the threat management facility 608 shown in FIG. 6A). The network resource may be a website accessible/identified by the URL.

At step 804, a category for the network resource is identified from a plurality of categories by applying the URL to a URL categorization model. As shown in FIG. 6A, the URL categorization model 612 may identify a category for the network resource 604 based on the URL. The URL categorization model is distilled from a fine-tuned large language model (LLM) as described above in relation to FIG. 5. In one embodiment, the URL categorization model is generated using the method 700 shown in FIG. 7.

At step 806, a policy is selected for processing the request based on the category. For example, an outbound URL may be identified by a URL categorization model as relating to "Gambling," and an enterprise policy related to the use of gambling websites by employees may be applied to process the outbound request (e.g., block the request). The policy may be managed by a threat management system for an enterprise network associated with the firewall.

At step 808, the request is processed according to the policy. The request may be either allowed or denied (blocked). If the request is denied, then a notification indicating that the request has been denied may be provided to the endpoint.

Figure 8B:
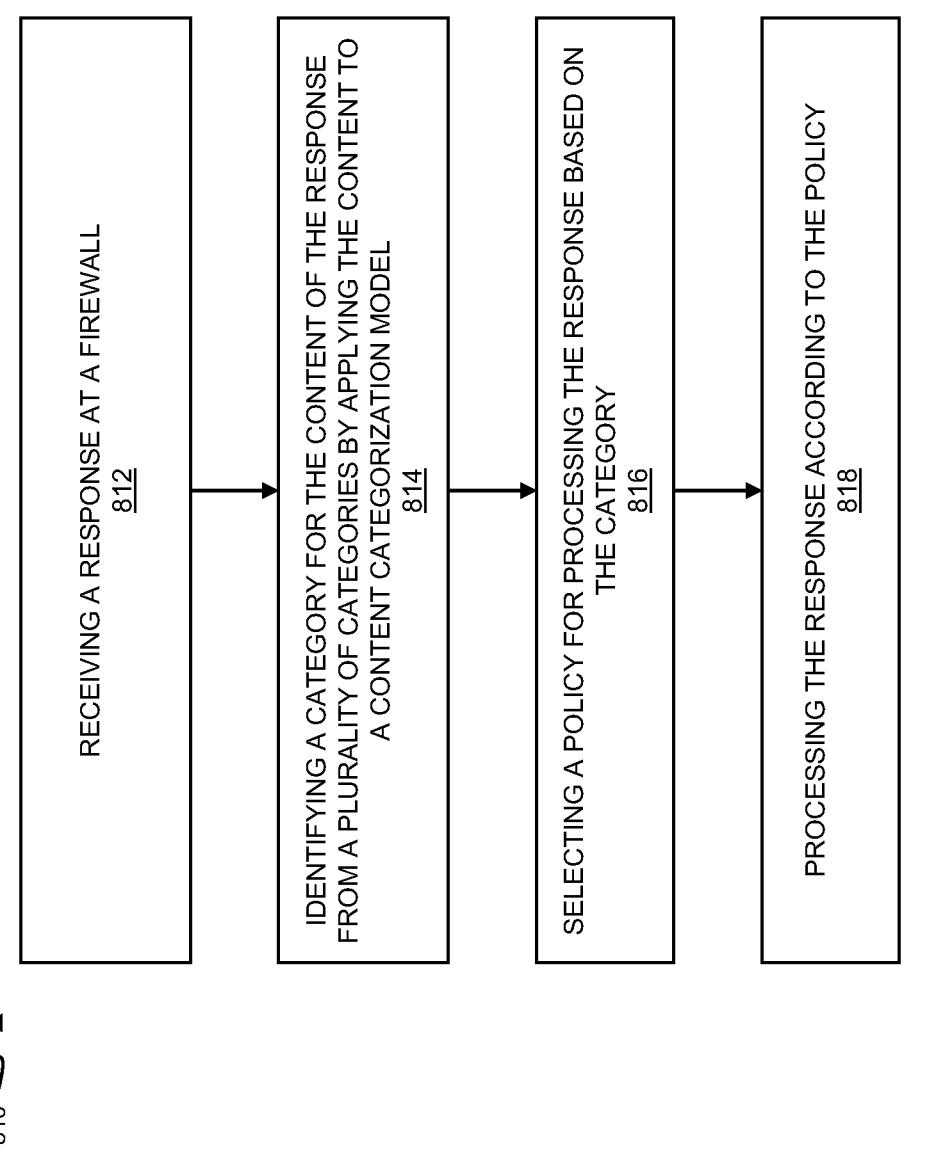
FIG. 8B depicts a flow diagram embodiment of a method for filtering responses using a content categorization model.

FIG. 8B depicts a flow diagram embodiment of a method 810 for filtering inbound responses using a content categorization model. To describe the flow diagram, reference will be made to FIGS. 5 and 6B, although it is understood that the flow diagram may be implemented in any other suitable environment or system. In one embodiment, the method 810 is performed with, or as part of, the method 700 shown in FIG. 7 and/or the method 800 shown in FIG. 8. For example, the steps of the method 810 may be performed as part of filtering responses with the inline content filter.

At step 812, a response is received at a firewall. The response may be received in response to a request from an endpoint. For example, and with reference to FIG. 6B, the response 620 is received at the firewall 606 and comprises content in relation to the network resource 604 in response to a request received from the endpoint 602.

At step 814, a category for content of the response is identified from a plurality of categories by applying the content to a content categorization model. As shown in FIG. 6B, the content categorization model 618 may identify a category for the content in the response 620 (e.g., "Sport", "Education", "Gambling", etc.). The content categorization model may be distilled from a fine-tuned large language model (LLM) as described above in relation to FIG. 5. In one embodiment, the content categorization model is generated using the method 700 shown in FIG. 7.

At step 816, a policy for processing the response is selected based on the category. For example, inbound HTML content may be identified by a content categorization model as relating to "Weapons" and an enterprise policy related to accessing websites relating to armaments may be applied to block the inbound HTML content from reaching the endpoint. The policy may be managed by a threat management system for an enterprise network associated with the firewall.

At step 818, the response is processed according to the policy. The response may be allowed such that the content is passed to the endpoint. Alternatively, the response may be denied such that the content is not passed to the endpoint. In such situations, a notification of denial may be provided to the endpoint in place of the requested content, and/or a notification may be sent to an administrator for the enterprise network receiving the requested content.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion, e.g., in a non-transitory computer readable medium such as a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims.

What is claimed is:

1. A computer program product comprising computer executable code embodied in a non-transitory computer readable medium that, when executing on one or more computing devices, causes the one or more computing devices to perform the steps of:

generating a labelled data set by labelling a data set of Uniform Resource Locator (URL) samples based on a plurality of categories of web content, wherein generating the labelled data set includes:

selecting a distribution tail of URLs in the data set, and inferring a description for one or more URLs in the distribution tail using a first large language model trained on at least a portion of the distribution tail;

generating a categorization model by fine-tuning a second large language model with the labelled data set to identify one of the plurality of categories for an input URL;

distilling the categorization model into a URL categorization model; and deploying the URL categorization model in an inline content filter for endpoint requests.

2. The computer program product of claim 1, further comprising code that causes the one or more computing devices to filter requests from an endpoint with the inline content filter.

3. The computer program product of claim 1, further comprising code that causes the one or more computing devices to perform the steps of:

receiving a request at a firewall comprising the inline content filter, from an endpoint, for a network resource identified by a URL;

identifying a category for the network resource from the plurality of categories by applying the URL to the URL categorization model;

selecting a policy for processing the request based on the category; and processing the request according to the policy.

4. The computer program product of claim 1, wherein labelling the data set includes labelling the data set using a domain-to-category mapping database with label propagation.

5. The computer program product of claim 1, wherein distilling the categorization model includes using the categorization model as a teacher model to train the URL categorization model as a student model that reproduces behavior of the categorization model with fewer parameters.

6. The computer program product of claim 1, wherein the inline content filter is configured to receive a URL in a request from an endpoint, determine one of the plurality of categories for the URL, and process the request based on a policy for the one of the plurality of categories for the URL.

7. The computer program product of claim 1, wherein the inline content filter is deployed in a firewall.

8. The computer program product of claim 7, wherein the firewall is at least one of an endpoint firewall and a gateway firewall.

9. The computer program product of claim 7, wherein the firewall is managed by a threat management facility for an enterprise network.

10. The computer program product of claim 7, wherein:

the inline content filter determines a category for a URL in a request received from an endpoint, the inline content filter applies a policy to the request based on the category, and the policy is managed by a threat management facility for an enterprise network associated with the firewall.

11. The computer program product of claim 1, wherein the inline content filter is deployed in an endpoint firewall.

12. The computer program product of claim 1, wherein the inline content filter is deployed in a firewall in a gateway to an enterprise network.

13. A method comprising:

generating a labelled data set by labelling a data set of content samples based on a plurality of categories of web content, wherein generating the labelled data set includes:

selecting a distribution tail of Uniform Resource Locators (URLs) in the data set, and inferring a description for one or more URLs in the distribution tail using a first large language model trained on at least a portion of the distribution tail;

generating a categorization model by fine-tuning a second large language model with the labelled data set to identify one of the plurality of categories for an item of web content;

distilling the categorization model into a content categorization model; and deploying the content categorization model in an inline content filter.

14. The method of claim 13, wherein the inline content filter is deployed in a firewall.

15. The method of claim 13, wherein the inline content filter is deployed in at least one of an endpoint and a gateway.

16. The method of claim 13, wherein the inline content filter is deployed to filter content retrieved in response to a network request from an endpoint.

17. The method of claim 13, wherein the content samples include one or more of images and text.

18. The method of claim 13, wherein the content samples include HTML metadata for web pages.

19. The method of claim 13, wherein distilling the categorization model includes using the categorization model as a teacher model to train the content categorization model as a student model that reproduces behavior of the categorization model with fewer parameters.

20. A system comprising:

an endpoint;

a network resource accessible by a Uniform Resource Locator (URL); and a firewall between the endpoint and the network resource, the firewall configured by computer executable code to process a request from the endpoint by:

determining a category for the URL with a URL categorization model, and applying a policy for an enterprise network associated with the firewall to the request based on the category, wherein the URL categorization model is configured by generating a labelled data set by labelling a data set of URL samples based on a plurality of categories of web content, generating the labelled data further including:

selecting a distribution tail of URLs in the data set, and inferring a description for one or more URLs in the distribution tail using a first large language model trained on at least a portion of the distribution tail, generating a categorization model by fine-tuning a second large language model with the labelled data set to identify one of the plurality of categories for an input URL, and distilling the categorization model into the URL categorization model.

\* \* \* \* \*